(12) United States Patent
Davies

(10) Patent No.: US 9,513,843 B2
(45) Date of Patent: Dec. 6, 2016

(54) METHOD AND APPARATUS FOR CHOOSING STORAGE COMPONENTS WITHIN A TIER

(75) Inventor: Ian Robert Davies, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 1329 days.

(21) Appl. No.: 12/897,948

(22) Filed: Oct. 5, 2010

(65) Prior Publication Data

US 2011/0252218 A1 Oct. 13, 2011

Related U.S. Application Data

(60) Provisional application No. 61/323,625, filed on Apr. 13, 2010.

(51) Int. Cl.
*G06F 12/00* (2006.01)
*G06F 11/10* (2006.01)
*G06F 3/06* (2006.01)

(52) U.S. Cl.
CPC ........... *G06F 3/0685* (2013.01); *G06F 3/0605* (2013.01); *G06F 3/0649* (2013.01)

(58) Field of Classification Search
CPC .... G06F 3/0643; G06F 3/0652; G06F 3/0653; G06F 17/30138; G06F 17/30156; G06F 17/30159; G06F 12/0871; G06F 12/0891; G06F 12/122; G06F 12/16
See application file for complete search history.

(56) References Cited

U.S. PATENT DOCUMENTS

| | | |
|---|---|---|
| 5,893,152 A | 4/1999 | Fuller et al. |
| 6,442,664 B1 | 8/2002 | Maynard et al. |
| 6,658,592 B1 | 12/2003 | Cohen et al. |
| 7,020,758 B2 * | 3/2006 | Fisk .................. H04L 41/08 711/114 |
| 7,062,631 B1 | 6/2006 | Klaiber et al. |
| 7,224,604 B2 | 5/2007 | Lasser |

(Continued)

OTHER PUBLICATIONS

Related U.S. Appl. No. 12/898,203 "Method and apparatus for rebalancing storage components within a storage tier", filed Oct. 5, 2010.

(Continued)

*Primary Examiner* — Yaima Rigol
*Assistant Examiner* — Mohamed Gebril
(74) *Attorney, Agent, or Firm* — Thomas J. Lavan

(57) ABSTRACT

A method for a storage controller to write a data block to one of a plurality of storage components is provided. The storage controller receives a write request from a host computer, and determines at least a portion of the data block includes a Logical Block Address (LBA) that is not currently mapped to a physical page of storage. The storage controller calculates availability for each storage component within the plurality of storage components, and selects the storage component with a highest calculated availability from the plurality of storage components. The storage controller next determines a next available physical page within the selected storage component. Finally, the storage controller writes the at least a portion of the data block including LBAs that are not currently mapped to a physical page of storage to the next available physical page.

20 Claims, 9 Drawing Sheets

(56) References Cited

U.S. PATENT DOCUMENTS

| | | | | |
|---|---|---|---|---|
| 7,398,418 B2* | 7/2008 | Soran | G06F 3/0608 | 711/114 |
| 7,454,566 B1* | 11/2008 | Overby | G06F 3/0607 | 711/100 |
| 7,882,307 B1* | 2/2011 | Wentzlaff | G06F 12/0813 | 711/119 |
| 7,971,025 B2* | 6/2011 | Murase | G06F 3/0607 | 711/161 |
| 8,332,594 B2* | 12/2012 | Borntraeger | G06F 12/109 | 711/147 |
| 8,499,114 B1* | 7/2013 | Vincent | G06F 9/5077 | 711/147 |
| 8,631,205 B1* | 1/2014 | Wentzlaff | G06F 12/0813 | 710/10 |
| 8,909,845 B1* | 12/2014 | Sobel | G06F 9/45558 | 711/154 |
| 2005/0268067 A1* | 12/2005 | Lee | G06F 12/10 | 711/202 |
| 2007/0038840 A1 | 2/2007 | Hummel et al. | | |
| 2008/0263299 A1* | 10/2008 | Suzuki | G06F 11/1662 | 711/162 |
| 2009/0204872 A1* | 8/2009 | Yu | G06F 3/0613 | 714/773 |
| 2009/0240880 A1* | 9/2009 | Kawaguchi | G06F 3/0617 | 711/114 |
| 2010/0169401 A1* | 7/2010 | Gopal | G06F 7/02 | 708/316 |
| 2010/0281208 A1* | 11/2010 | Yang | G06F 3/0611 | 711/103 |
| 2010/0306174 A1* | 12/2010 | Otani | G06F 11/1464 | 707/640 |
| 2011/0185120 A1* | 7/2011 | Jess | G06F 3/061 | 711/114 |

OTHER PUBLICATIONS

Notice of Allowance for U.S. Appl. No. 12/898,203, mailed Oct. 22, 2012.
Office Action for U.S. Appl. No. 13/612,295, mailed Jun. 20, 2014.
Notice of Allowance for U.S. Appl. No. 13/612,295, mailed Jan. 8, 2015.
Notice of Allowance for U.S. Appl. No. 13/612,295, mailed Feb. 13, 2015.

* cited by examiner

Fig. 4a  Allocation of adjacent page
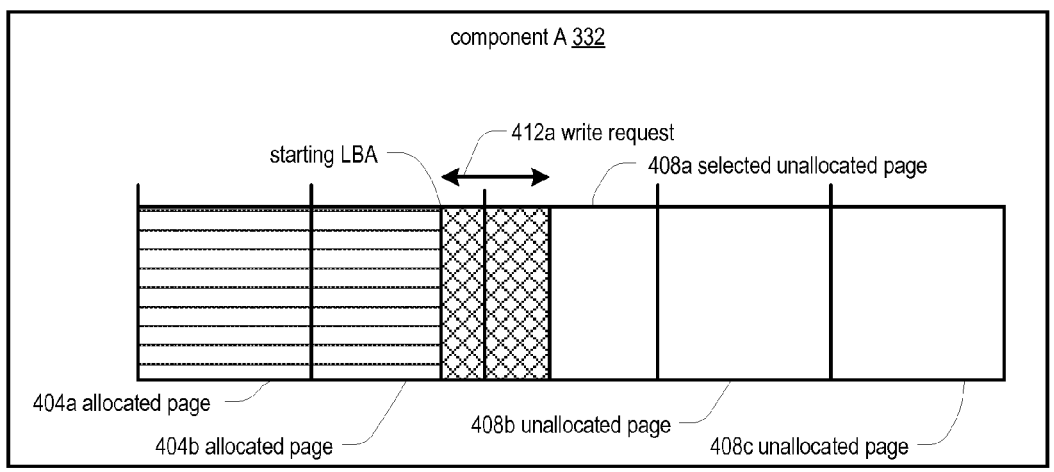
Fig. 4b  Allocation of page in different component from starting LBA
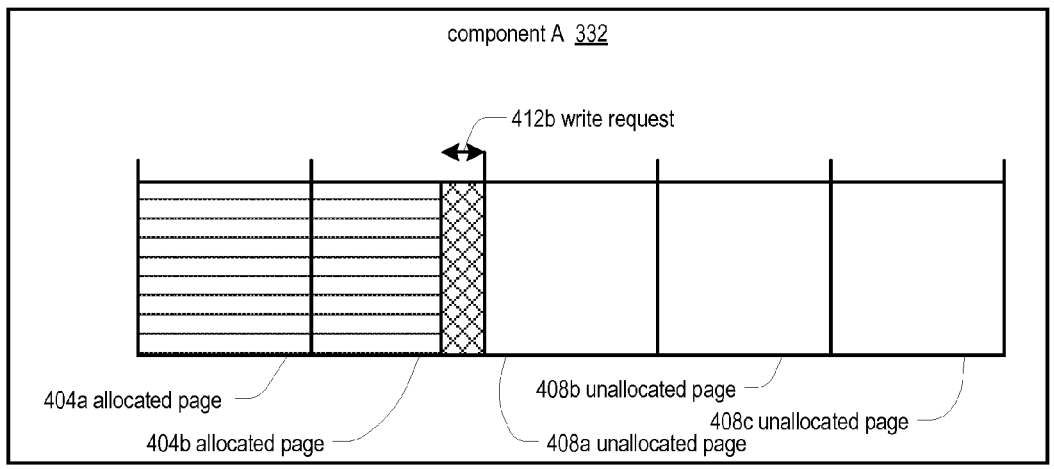
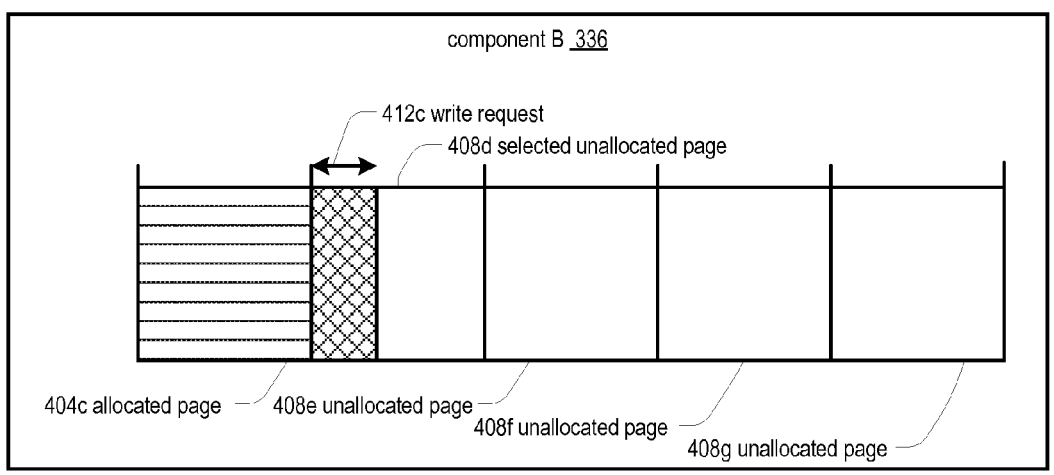

| 504 Component A I/O counter |
| 508 Component B I/O counter |
| 512 Component C I/O counter |

528 Component A allocated page map

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 0 | 0 | 0 | 1 | 1 |
| 0 | 0 | 0 | 0 | 0 | 0 | 0 |
| 1 | 1 | 1 | 1 | 1 | 1 | 1 |

} 516 Component A in-use pages

532 Component B allocated page map

| 1 | 1 | 1 | 0 | 0 | 0 | 0 |
|---|---|---|---|---|---|---|
| 1 | 1 | 1 | 1 | 1 | 1 | 1 |
| 0 | 1 | 1 | 1 | 1 | 1 | 1 |
| 1 | 1 | 1 | 1 | 1 | 0 | 0 |
| 0 | 0 | 1 | 1 | 0 | 0 | 1 | 0 |
| 0 | 0 | 0 | 0 | 0 | 0 | 0 |

} 520 Component B in-use pages

536 Component C allocated page map

| 1 | 0 | 1 | 0 | 0 | 0 | 1 | 1 |
|---|---|---|---|---|---|---|---|
| 1 | 1 | 1 | 1 | 1 | 1 | 1 |
| 0 | 0 | 0 | 0 | 0 | 0 | 0 |
| 0 | 1 | 1 | 1 | 1 | 0 | 0 |
| 0 | 0 | 1 | 1 | 1 | 0 | 1 | 0 |
| 1 | 1 | 1 | 1 | 1 | 0 | 0 |

} 524 Component C in-use pages

Fig. 6a     Host write request to unmapped LBA
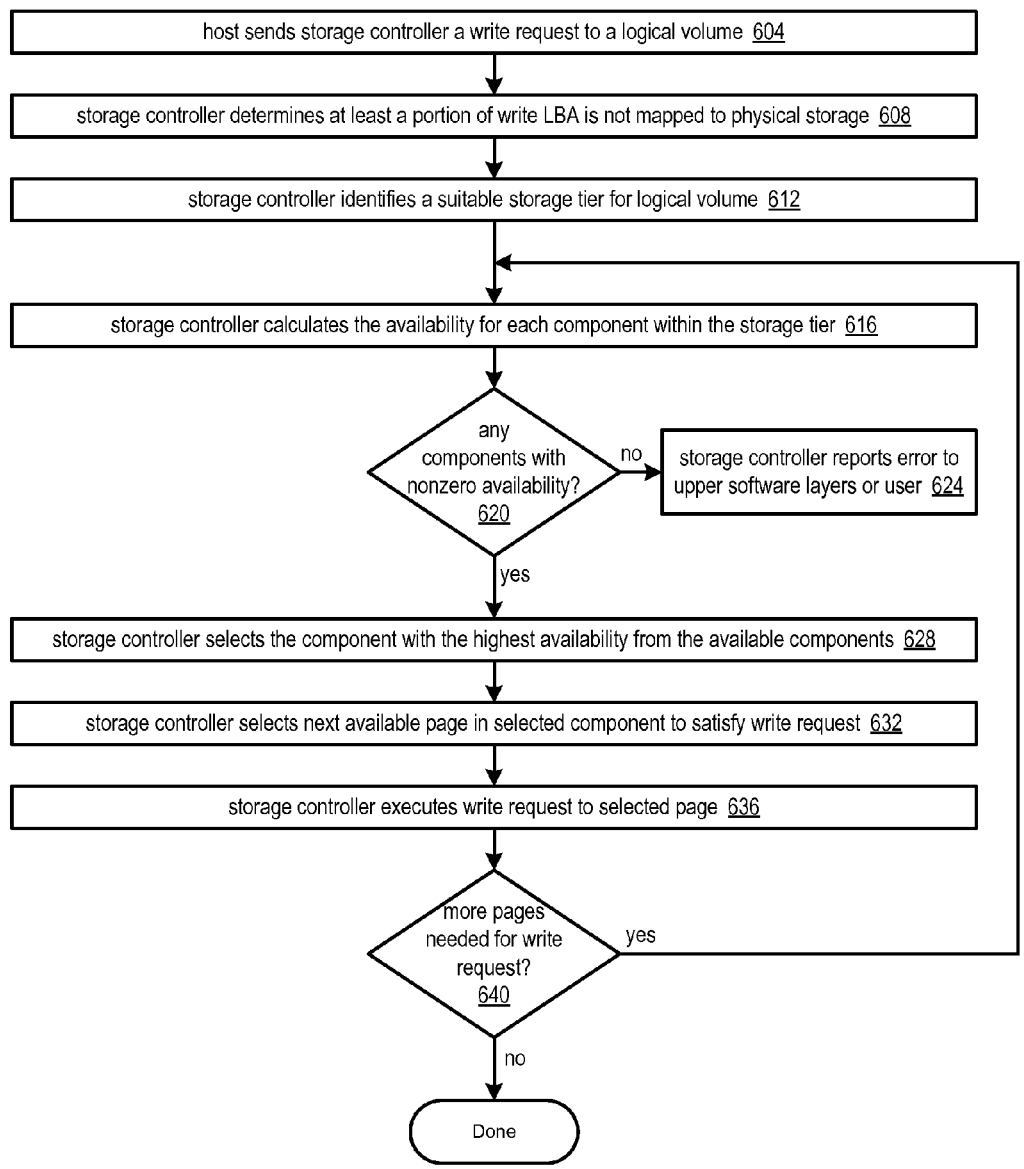

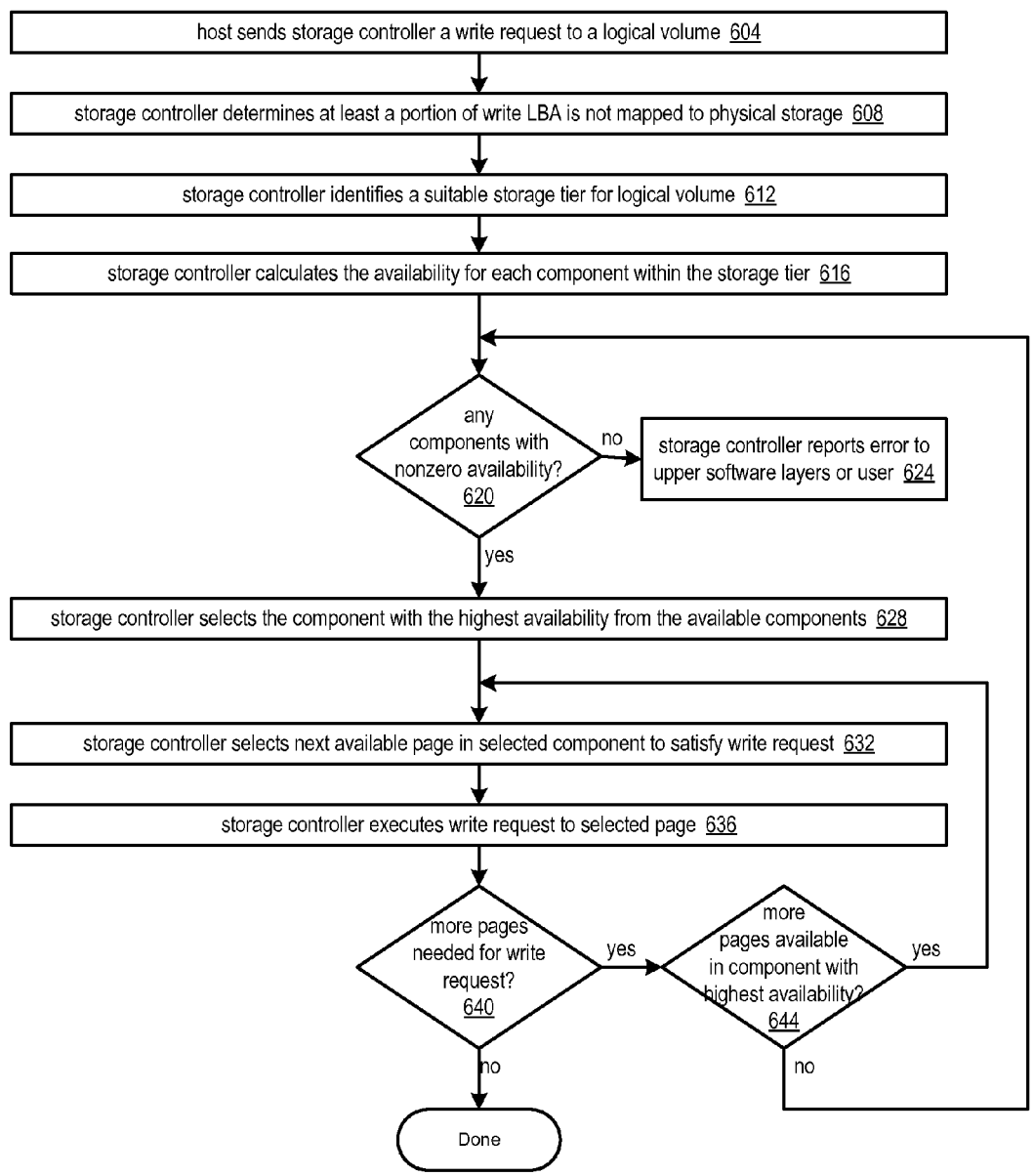
Fig. 6b    Host write request to unmapped LBA

Fig. 7   Availability calculation
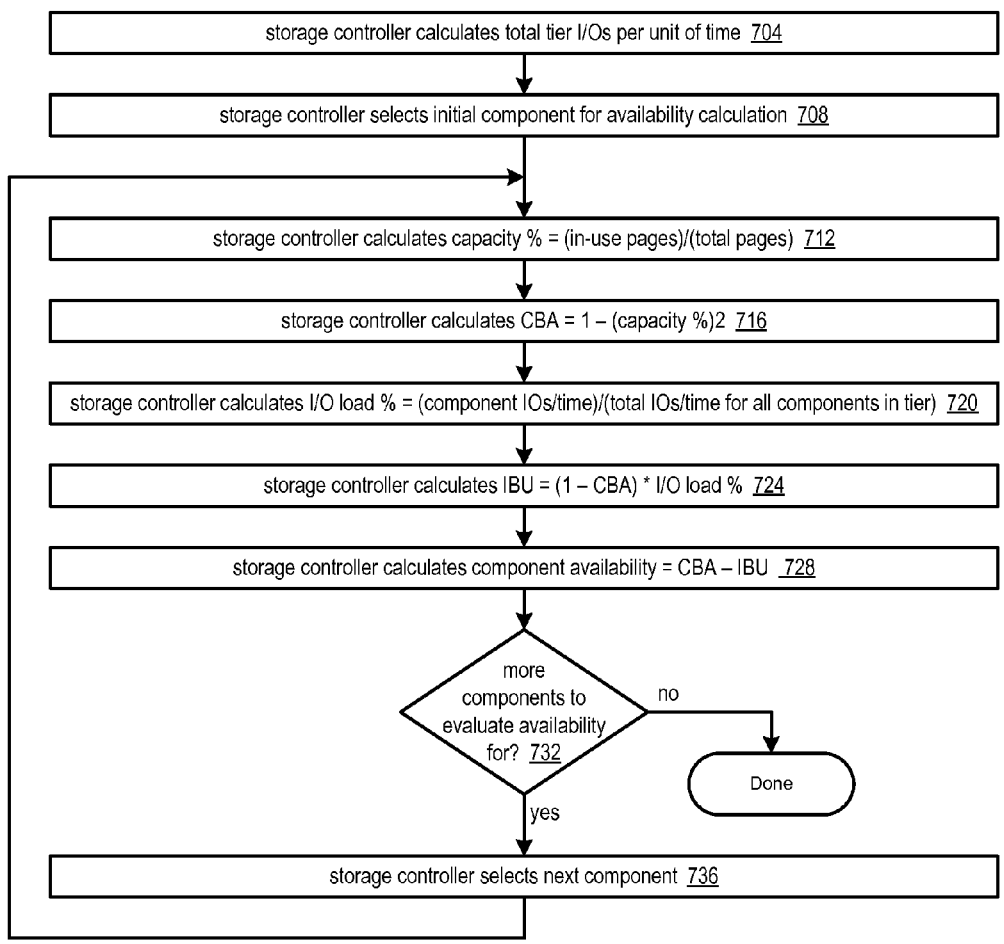

Fig. 8

|  | Component A 332 | Component B 336 | Component C 340 | Total |
|---|---|---|---|---|
| IOs/min 804 | 15 | 10 | 20 | 45 704 |
| I/O load % 720 | 33.3% | 22.2% | 44.4% | |
| in-use pages 808 | 100/1000 | 200/1000 | 200/2000 | |
| Capacity % 712 | 10% | 20% | 10% | |
| Capacity-based availability 716 | 0.99 | 0.96 | 0.99 | |
| I/O load-based utilization 724 | 0.0033 | 0.0088 | 0.0044 | |
| Component availability 728 | 98.9967% | 95.9912% | 98.9956% | |

Highest availability 816

Lowest availability 820

METHOD AND APPARATUS FOR CHOOSING STORAGE COMPONENTS WITHIN A TIER

CROSS REFERENCE TO RELATED APPLICATION(S)

This application claims the benefit of pending U.S. Provisional Application Ser. No. 61/323,625 filed Apr. 13, 2010, entitled METHOD AND APPARATUS FOR CHOOSING STORAGE COMPONENTS WITHIN A TIER, which is hereby incorporated by reference for all purposes and which were owned or subject to an obligation of assignment to Dot Hill Systems Corporation at the time the invention claimed herein was made. This application is related to pending Non-Provisional U.S. application Ser. No. 12/898,203, filed Oct. 5, 2010, entitled METHOD AND APPARATUS FOR REBALANCING STORAGE COMPONENTS WITHIN A STORAGE TIER (inventor Ian Robert Davies).

FIELD

The present invention is directed to computer data storage. In particular, the present invention is directed to methods and apparatuses for selecting an optimal data storage component among a group of storage components within a storage tier.

BACKGROUND

Computers utilize a variety of data storage approaches for mass data storage. Various types of data storage devices and organization of groups of data storage devices are used to provide primary storage, near line storage, backup storage, hierarchical storage, and various types of storage virtualization and data replication.

Data storage devices include tape storage, disk drives, optical drives, and solid state disks. In terms of performance, solid state disks provide the best performance, followed by hard disk drives. Optical and tape storage devices provide significantly slower performance compared to hard disk drives and solid state disks.

Within a given storage device type, various storage devices may have different performance attributes. For example, hard disk drives come in multiple rotation speeds, cache sizes, track density, and other physical parameters. Rotation speeds of 5,400, 7,200, 10,000, and 15,000 RPM are currently available, with cache sizes ranging from 32 MB to 8 GB and more. Therefore, it is possible to create sub-groups of a particular storage device type based on performance attributes of each sub-group.

Although it would be desirable to have unlimited amounts of the fastest possible data storage, in most cases that approach is cost prohibitive and a waste of money. Solid state disks, for example, make a very inefficient choice for offline data storage, where data can often be written off-hours when data networks and servers are lightly used. Additionally, data storage needs almost always increase over time in order to accommodate new data to be stored, backed up, virtualized, and so on.

SUMMARY

The present invention is directed to solving disadvantages of the prior art. In accordance with embodiments of the present invention, a method for a storage controller to write a data block to one of a plurality of storage components is provided. The storage controller receives a write request from a host computer, and determines at least a portion of the data block resides on a Logical Block Address (LBA) that is not currently mapped to a physical page of storage. The storage controller calculates availability for each storage component within the plurality of storage components, and selects the storage component with a highest calculated availability from the plurality of storage components. The storage controller next determines a next available physical page within the selected storage component. Finally, the storage controller writes the at least a portion of the data block including LBAs that are not currently mapped to a physical page of storage to the next available physical page.

In accordance with other embodiments of the present invention, a system for writing a data block is provided. The system includes a host computer, which generates a write request comprising the data block. The system includes a plurality of storage components. Each of the plurality of storage components includes a plurality of physical pages. The write request is directed to a range of logical block addresses (LBAs) within the plurality of storage components. The system also includes a storage controller, which is coupled to the host computer and the plurality of storage components. The storage controller includes a processor. The storage controller receives the write request from the host computer, and in response the processor determines at least a portion of the data block includes an LBA that is not currently mapped to a physical page of storage. Next, the processor calculates availability for each storage component within the plurality of storage components, and selects the storage component with a highest calculated availability from the plurality of storage components. The processor then determines a next available physical page within the selected storage component and writes the portion of the data block including LBAs that are not currently mapped to a physical page of storage to the next available physical page.

An advantage of the present invention include an efficient means of identifying a new unallocated page from a plurality of storage components so that data access to the plurality of storage components is balanced. Another advantage of the present invention is the ability to perform simple calculations based on storage component statistics to determine the next storage component that supplies an unallocated page to satisfy a write request.

Additional features and advantages of embodiments of the present invention will become more readily apparent from the following description, particularly when taken together with the accompanying drawings.

BRIEF DESCRIPTION OF THE DRAWINGS

FIG. 4a is a block diagram illustrating page allocation in accordance with a first embodiment of the present invention.

FIG. 4b is a block diagram illustrating page allocation in accordance with a second embodiment of the present invention.

FIG. 5 is a block diagram illustrating data structures of the present invention stored in memory.

FIG. 6a is a flowchart illustrating a method for performing a host write request in accordance with a first embodiment of the present invention.

FIG. 6b is a flowchart illustrating a method for performing a host write request in accordance with a second embodiment of the present invention.

FIG. 7 is a flowchart illustrating a method for calculating component availability in accordance with embodiments of the present invention.

FIG. 8 is a table illustrating an exemplary component availability calculation in accordance with embodiments of the present invention.

DETAILED DESCRIPTION

Figure 1A:
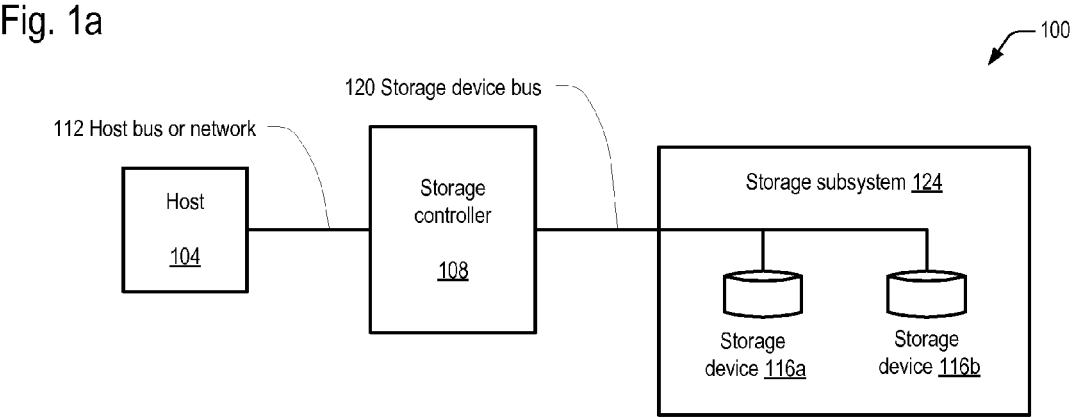
FIG. 1a is a block diagram illustrating components of a first non host-based electronic data storage system in accordance with embodiments of the present invention.

The present invention is directed to the problem of automatically selecting a storage component from a plurality of storage components within a storage tier. In a preferred embodiment, a RAID controller performs the selection of storage components. Either RAID controller hardware or firmware running on a CPU of the RAID controller performs the invention. In other embodiments, a non-RAID storage controller or host adapter performs the invention. In other embodiments, a host device driver or storage application performs the invention. In other embodiments, a network switch or storage appliance performs the invention.

A storage tier is a collection of data storage elements having similar performance characteristics, as defined by the user. Performance is generally expressed in terms of Megabytes per second (MB/s) for sequential workloads and I/Os per second (IOPs) for random workloads. A storage tier may contain one type of data storage, or multiple types, and a storage system would have at least one, and possibly several, storage tiers. In a practical sense, storage components and storage tiers apply to randomly accessible data storage means, including several technologies of hard disk drives and solid state disk. A storage tier may reflect a specific performance level (usually reflecting a single type of storage device), or may reflect a range of performance parameters such as above a certain IOPs number or MB/s above a certain number and below a different number. For example, a storage system may have three components: one with solid state disk (SSD), one with enterprise-class SAS drives, and one with midline/near line storage (such as less expensive SATA disk drives or low end SAS disk drives with SATA mechanical structures and a SAS interface). Among hard disk drive technologies, Enterprise class disks are generally the fastest means of storage and in one embodiment have 10K/15K RPM and fast seeks. However, solid state disks (SSDs) are today the performance leaders.

A storage component is any logically-addressable storage entity. It could be a single storage device, a RAID volume, or a separate partition on either a single storage device or multiple storage devices. Relative to the present invention, there is a plurality of components (i.e. 2 or more) within a tier. The problem space involves selecting one component from the plurality of components in a storage tier to provide one or more pages of storage.

Every component is organized into storage pages. A page is the smallest unit for newly allocated storage space, although multiple pages may need to be allocated to satisfy a write request. If multiple newly allocated pages are required, the allocated pages may be physically adjacent or not. However, the allocated pages would be logically adjacent.

A page can be any size, but in a preferred embodiment is 8 MB. In a practical sense, the minimum page size is a sector size, which would be commonly 512 KB (or 4 KB in newer disk drives), and the maximum size would be perhaps 64 MB-128 MB. However, these limits are somewhat arbitrary, and reflect the amount of storage required for storage component data structures. More storage is required for data structures when smaller page sizes are used, since more page data structures are required. The larger the page size, the potential for more wasted or unused space within an allocated page. Another disadvantage of large pages is the time it takes to move a large page is greater than the time required to move a small page since large pages store more data. Each page stores multiple blocks, where blocks are disk sectors. In one embodiment, the block size is 512 bytes, and there would be 16,384 blocks in an 8 MB page. In another embodiment, the block size is 4 KB and there would be 2048 blocks in an 8 MB page.

The present invention is used for a host write request that touches a Logical Block Address (LBA) that is not currently mapped to a physical page of storage. Such a write could fill up the last allocated page of storage, thus requiring allocation of more storage space. This is not generally host visible, and applications do not track page allocations. Since I/Os are generally 64 KB or smaller, it is unlikely that more than one new page would be required for a given write request. However, up to 2 new pages could potentially be needed for a given write request, if the request crosses a page boundary. When multiple pages are needed, a first embodiment of the present invention allocates one new page per each algorithm execution. Although the first embodiment only allocates one new page at a time, other embodiments are envisioned that could allocate multiple pages simultaneously.

Referring now to FIG. 1a, a block diagram illustrating components of a first non host-based electronic data storage system 100 in accordance with embodiments of the present invention is shown. The electronic data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a storage interconnect such as SCSI, Fibre Channel, USB, Firewire, SSA, SAS, SATA, or Infiniband. In another embodiment, host bus or network 112 is a network such as Ethernet, iSCSI, Fibre Channel, SSA, ESCON, ATM, FICON or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus for transferring data directly between storage controller 120 and storage devices 116, including SCSI, Fibre Channel, SAS, SATA, or SSA.

Storage subsystem 124 in one embodiment contains twenty four storage devices 116. In other embodiments, storage subsystem 124 may contain fewer or more than twenty four storage devices 116. Storage devices 116 include various types of devices, including hard disk drives, solid state drives, optical drives, and tape drives. Within a specific storage device type, there may be several sub-categories of storage devices, organized according to performance. For example, hard disk drives may be organized according to cache size, drive RPM (5,400, 7,200, 10,000, and 15,000, for example), queue depth, random transfer rate, or sequential transfer rate (or some combination of these metrics).

Figure 1B:
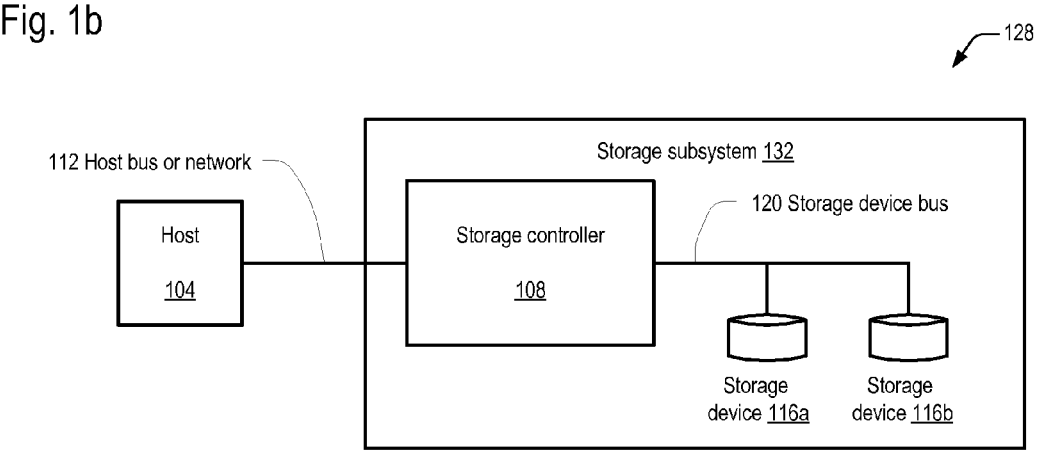
FIG. 1b is a block diagram illustrating components of a second non host-based electronic data storage system in accordance with embodiments of the present invention.

Referring now to FIG. 1b, a block diagram illustrating components of a second non host-based electronic data storage system 128 in accordance with embodiments of the present invention is shown. Non host-based electronic data storage system 128 is similar to non host-based electronic data storage system 100, with the exception being storage controller 108 is within storage system 132, along with storage devices 116. In one embodiment, storage controller 108 is a single RAID controller. In a second embodiment, storage controller 108 is a pair of redundant RAID controllers.

Figure 2A:
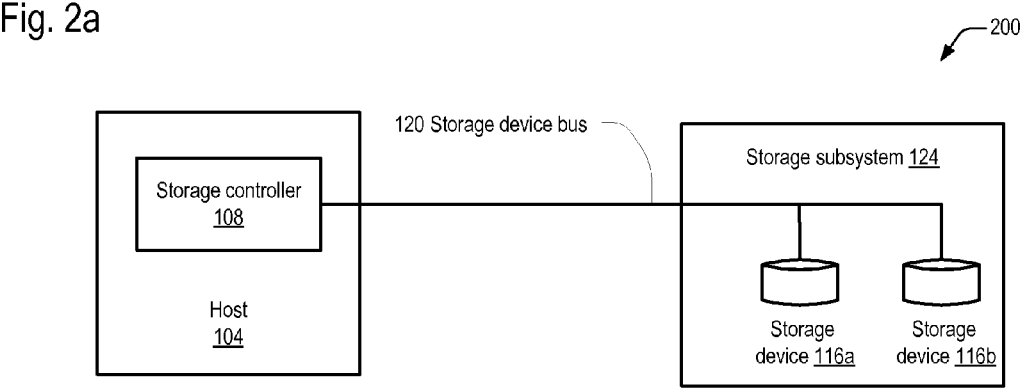
FIG. 2a is a block diagram illustrating components of a first host-based electronic data storage system in accordance with embodiments of the present invention.

Referring now to FIG. 2a, a block diagram illustrating components of a first host-based electronic data storage system 200 in accordance with embodiments of the present invention is shown. Electronic data storage system 200 is similar to data storage systems 100 and 128, except storage controller 108 is within host computer 104. Storage controller 108 interfaces through a local bus of host computer 104, where the local bus may be any suitable bus for high speed transfers between the CPU of host computer 104 and storage controller 108, including PCI, PCI-X, or PCI Express. Storage controller 108 may either be integrated on the motherboard of host computer 104, or may be an add-in board or other form of assembly in host computer 104.

Figure 2B:
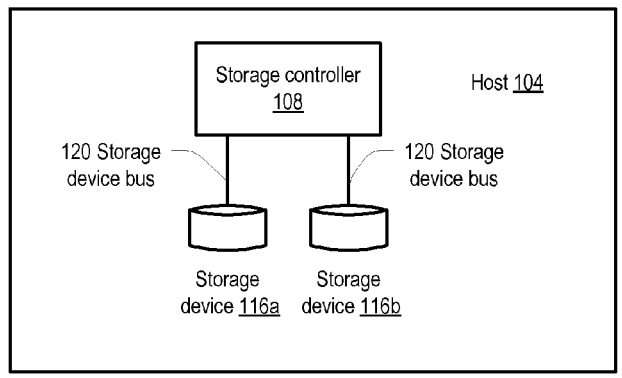
FIG. 2b is a block diagram illustrating components of a second host-based electronic data storage system in accordance with embodiments of the present invention.

Referring now to FIG. 2b, a block diagram illustrating components of a second host-based electronic data storage system 204 in accordance with embodiments of the present invention is shown. Electronic data storage system 204 is similar to data storage system 200, except storage devices 116 are within host computer 104.

Figure 2C:
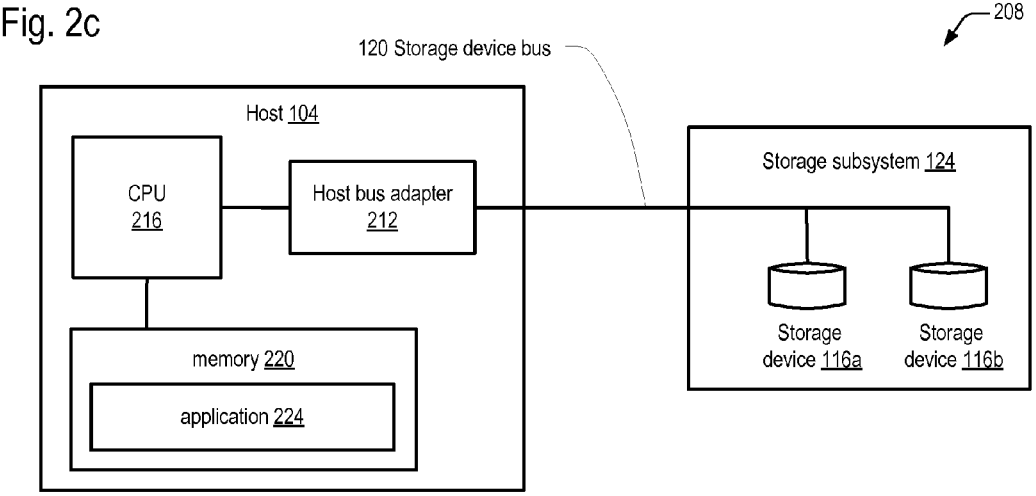
FIG. 2c is a block diagram illustrating components of a third host-based electronic data storage system in accordance with embodiments of the present invention.

Referring now to FIG. 2c, a block diagram illustrating components of a third host-based electronic data storage system 208 in accordance with embodiments of the present invention is shown. Electronic data storage system 208 is similar to data storage system 200 of FIG. 2a, with additional detail within host computer 104. Host computer 104 includes host bus adapter 212, which generates read and write requests to storage devices 116 in storage subsystem 124. Storage controller 108 in FIGS. 1a, 1b, 2a, and 2b executes the process of FIGS. 6-8. In FIG. 2c, CPU 216 executes the process of FIGS. 6-8. Application 224 in memory 220 stores the instructions that perform the steps of the present invention.

Figure 3:
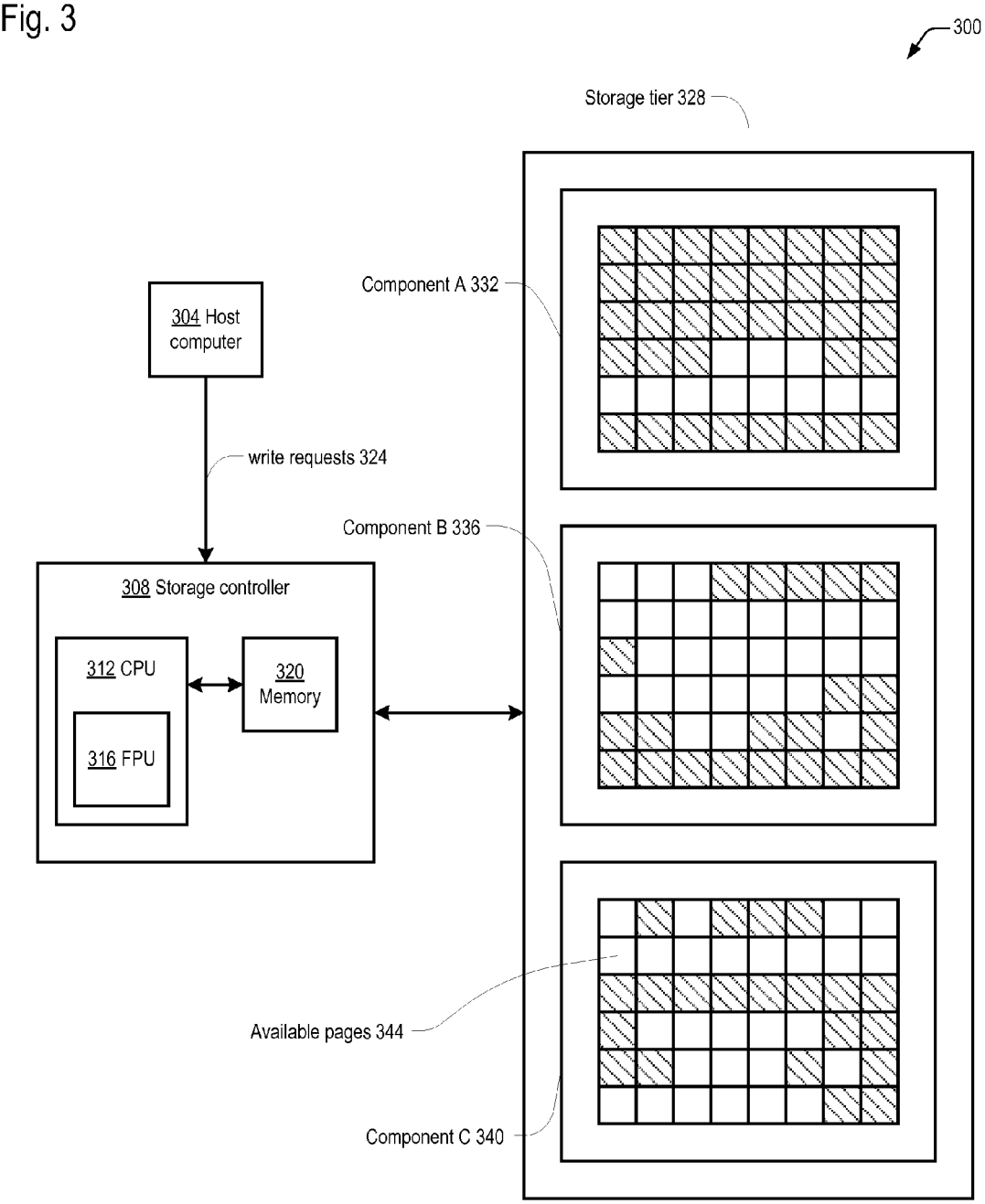
FIG. 3 is a block diagram illustrating components of an electronic data storage system including a storage tier in accordance with embodiments of the present invention.

Referring now to FIG. 3, a block diagram illustrating components of an electronic data storage system 300 including a storage tier 328 in accordance with embodiments of the present invention is shown. Host computer 304 generates read requests and write requests 324 to storage controller 308. Storage controller 308 is equivalent to storage controller 108 and generates read and write requests to storage tier 328.

Storage controller 308 includes CPU 312, which executes the process steps of the present invention. CPU 312 is in one embodiment an X86-compatible processor such as those provided by Intel, AMD, or Via technologies. In other embodiments, CPU 312 is an embedded or mobile processor such as a processor from the ARM or PowerPC families. However, CPU may be any processor that executes stored programs. CPU 312 in a preferred embodiment includes floating point unit 316, which executes floating point arithmetic instructions. Floating point arithmetic in some applications provides greater precision and computational performance over integer arithmetic. CPU 312 is coupled to memory 320. Memory 320 provides storage for computer programs that perform the process steps of FIGS. 6-8, and associated data structures. Memory 320 may include both volatile memory and non-volatile memory.

Storage devices 116 are organized into one or more storage tiers 328. Each storage tier 328 is organized into one or more storage components. In a preferred embodiment, storage components are RAID sets. In one embodiment, storage tier 328 includes three storage components: component A 332, component B 336, and component C 340. Each of component A 332, component B 336, and component C 340 is organized into storage pages. Over time, storage components 332, 336, and 340 have storage pages that have been written to, and other pages that have not been written to.

The storage pages that have not been written to are available pages 344. It is likely that each storage component 332, 336, and 340 will have a different number of available pages 344, and the available pages 344 will be in different physical locations within each storage component.

The present invention deals with the problem of handling a write request 324 that requires an available page 344 to store at least part of the data of the write request 324. The storage tier 328 the write request 324 is directed to includes at least two storage components 332, 336, 340. The method of the present invention determines which of the storage components 332, 336, 340 in the storage tier 328 provides available pages 344 for write requests 324, as further described with respect to FIGS. 4-8.

Referring now to FIG. 4a, block diagram illustrating page allocation in accordance with a first embodiment of the present invention is shown. Component A 332 includes many pages, of which five pages are shown. Pages 404a and 404b are allocated pages, which have data already written prior to new write request 412a. Pages 408a, 408b, and 408c are unallocated pages, which do not have data written prior to new write request 412a. Write request 412a has a starting logical block address (LBA) that is located within allocated page 404b. However, write request 412a is larger than the unallocated space within allocated page 404b, so the write request cannot be completed within allocated page 404b. If the present invention determines that component A 332 provides the unallocated page 408 to complete write request 412a, unallocated page 408a is selected to complete the write request 412a.

Referring now to FIG. 4b, a block diagram illustrating page allocation in accordance with a second embodiment of the present invention is shown. This diagram illustrates the case in which a write request starting LBA is in a first storage component, but the selected unallocated page is in a different storage component. Write request 412b has a starting LBA in allocated page 404b of component A 332, and similar to write request 412a of FIG. 4a. In component A 332, pages 404a and 404b are allocated pages, and pages 408a, 408b, and 408c are unallocated pages. In component B 336, pages 404c is an allocated page and pages 408d, 408e, 408f, and 408g are unallocated pages. If the present invention determines that component B 336 provides the unallocated page 408 to complete write request 412b, unallocated page 408d is selected to complete the write request 412b.

Referring now to FIG. 5, a block diagram illustrating data structures of the present invention stored in memory 320 is shown. The data structures are used in the calculations of FIGS. 6-8.

The component availability calculation of FIGS. 7 and 8 requires I/O counters to calculate IOs/time 804 and I/O load percentage 720. Therefore, memory 320 includes a component A I/O counter 504, a component B I/O counter 508, and a component C I/O counter 512.

For the capacity percentage calculation of block 712, the in-use pages for each component must be known. Therefore, memory 320 stores a component A allocated page map 528, a component B allocated page map 532, and a component C allocated page map 536. Each page within a component is represented by a single bit in the allocated page map. In one embodiment, a free page is indicated by a zero and an in-use page is represented by a '1'. In a second embodiment, a free page is indicated by a '1' and an in-use page is represented by a zero. Each time a new page is allocated, the CPU 312 updates the appropriate bit in the appropriate allocated page map 528, 532, 536.

In-use pages are determined by counting the in-use pages in allocated page maps 528, 532, 536. Therefore, component A in-use pages 516 is the number of in-use pages in component A allocated page map 528, component B in-use pages 520 is the number of in-use pages in component B allocated page map 532, and component C in-use pages 524 is the number of in-use pages in component C allocated page map 536.

Referring now to FIG. 6a, a flowchart illustrating a method for performing a host write request 324 in accordance with a first embodiment of the present invention is shown. The write request 324 of FIG. 6a contains at least a portion that is not mapped to an allocated page 404 within storage tier 328. Flow begins at block 604.

At block 604, a host 304 sends a storage controller 308 a write request 324 to a logical volume. The logical volume is on storage devices 116, and within storage tier 328. Flow proceeds to block 608.

At block 608, the storage controller 308 determines at least a portion of the write LBA is not mapped to physical storage. This means a new unallocated page within the storage tier 328 must be found. Flow proceeds to block 612.

At block 612, the storage controller 308 identifies a suitable storage tier 328 for the logical volume. Only a single storage tier 328 is illustrated in FIG. 3, since the present invention is directed to identifying a storage component 332, 336, 340 within a given storage tier, and not selecting a storage tier from a plurality of storage tiers. Flow proceeds to block 616.

At block 616, storage controller 308 calculates the availability for each component 332, 336, 340 within the storage tier 328. The component availability calculation is described in more detail with respect to FIG. 7. Flow proceeds to decision block 620.

At decision block 620, the process determines if there are any components with nonzero availability. If there are not any components with nonzero availability, then there are no unallocated pages 408 within the storage tier 328, and the write request 324 cannot be completed. In that case, flow proceeds to block 624. If there are any components with nonzero availability, then at least one unallocated page 408 remains within storage tier 328. In that case, flow proceeds to block 628.

At block 624, storage controller 308 reports an error to the upper software layers of storage controller 308, or a user. The error indicates that insufficient space remains within storage tier 328, and more space needs to be added. In one embodiment, a user or system administrator adds another component (component D) to storage tier 328. In another embodiment, the user or system administrator adds new storage devices 116 to one or more existing components 332, 336, 340. Flow ends at block 624.

At block 628, storage controller 308 selects the component 332, 336, 340 with the highest availability from the available components 332, 336, 340. If only one component has nonzero availability, that component is chosen. If two or more components have nonzero availability, the component with the highest availability is selected. If components have identical availability, then any component convenient to the implementation is chosen. (For example, this is often the first component in the list of components). Flow proceeds to block 632.

At block 632, storage controller 308 selects the next available page in the selected component 332, 336, 340 to satisfy the write request 324. In one embodiment, the next available page is the first available page found after starting from the lowest component LBA in the component 332, 336, 340. Component LBAs are not host-visible. In a second embodiment, the next available page is the first available page found after starting from the highest LBA in the component 332, 336, 340. In a third embodiment, the next available page is the page with the fewest consecutive available pages in the component 332, 336, 340. The third embodiment therefore obtains a page from the smallest gaps between allocated pages within the component. In the case of component A 332 of FIG. 3, the next available page comes from the group of three consecutive available pages 344 in the fourth row. Either the first, second, or third of three pages may be selected. Flow proceeds to block 636.

At block 636, storage controller 308 executes the write request 324 to the selected page. If the selected page is the unallocated page 408 immediately following the allocated page 404 the starting LBA is in, the write is completed as illustrated in FIG. 4a. If the selected page is an unallocated page 408 in a different component from the allocated page 404 the starting LBA is in, the write is completed as illustrated in FIG. 4b. Flow proceeds to decision block 640.

At decision block 640, the process determines if more pages are needed for the write request 324. More pages are needed if the write request 324 exceeds the remaining free space in the page. If no more pages are needed, then the process ends. If more pages are needed for the write request 324, then flow proceeds to block 616 to determine availability for the next allocated page.

Referring now to FIG. 6b, a flowchart illustrating a method for performing a host write request 324 in accordance with a second embodiment of the present invention is shown. The write request 324 of FIG. 6b contains at least a portion that is not mapped to an allocated page 404 within storage tier 328. Flow begins at block 604.

At block 604, a host 304 sends a storage controller 308 a write request 324 to a logical volume. The logical volume is on storage devices 116, and within storage tier 328. Flow proceeds to block 608.

At block 608, the storage controller 308 determines at least a portion of the write LBA is not mapped to physical storage. This means a new unallocated page within the storage tier 328 must be found. Flow proceeds to block 612.

At block 612, the storage controller 308 identifies a suitable storage tier 328 for the logical volume. Only a single storage tier 328 is illustrated in FIG. 3, since the present invention is directed to identifying a storage component 332, 336, 340 within a given storage tier, and not selecting a storage tier from a plurality of storage tiers. Flow proceeds to block 616.

At block 616, storage controller 308 calculates the availability for each component 332, 336, 340 within the storage tier 328. The component availability calculation is described in more detail with respect to FIG. 7. Flow proceeds to decision block 620.

At decision block 620, the process determines if there are any components with nonzero availability. If there are not any components with nonzero availability, then there are no unallocated pages 408 within the storage tier 328, and the write request 324 cannot be completed. In that case, flow proceeds to block 624. If there are any components with nonzero availability, then at least one unallocated page 408 remains within storage tier 328. In that case, flow proceeds to block 628.

At block 624, storage controller 308 reports an error to the upper software layers of storage controller 308, or a user. The error indicates that insufficient space remains within storage tier 328, and more space needs to be added. In one embodiment, a user or system administrator adds another component (component D) to storage tier 328. In another embodiment, the user or system administrator adds new storage devices 116 to one or more existing components 332, 336, 340. Flow ends at block 624.

At block 628, storage controller 308 selects the component 332, 336, 340 with the highest availability from the available components 332, 336, 340. If only one component has nonzero availability, that component is chosen. If two or more components have nonzero availability, the component with the highest availability is selected. If components have identical availability, then any component convenient to the implementation is chosen. (For example, this is often the first component in the list of components). Flow proceeds to block 632.

At block 632, storage controller 308 selects the next available page in the selected component 332, 336, 340 to satisfy the write request 324. In one embodiment, the next available page is the first available page found after starting from the lowest LBA in the component 332, 336, 340. In a second embodiment, the next available page is the first available page found after starting from the highest LBA in the component 332, 336, 340. In a third embodiment, the next available page is the page with the fewest consecutive available pages in the component 332, 336, 340. The third embodiment therefore obtains a page from the smallest gaps between allocated pages within the component. In the case of component A 332 of FIG. 3, the next available page comes from the group of three consecutive available pages 344 in the fourth row. Either the first, second, or third of three pages may be selected. Flow proceeds to block 636.

At block 636, storage controller 308 executes the write request 324 to the selected page. If the selected page is the unallocated page 408 immediately following the allocated page 404 the starting LBA is in, the write is completed as illustrated in FIG. 4a. If the selected page is an unallocated page 408 in a different component from the allocated page 404 the starting LBA is in, the write is completed as illustrated in FIG. 4b. Flow proceeds to decision block 640.

At decision block 640, the process determines if more pages are needed for the write request 324. More pages are needed if the write request 324 exceeds the page size. If no more pages are needed, then the flow ends. If more pages are needed for the write request 324, then flow proceeds to decision block 644.

At decision block 644, the process determines if more pages are available in the component 332, 336, 340 with the highest availability. The component availability was previously calculated in block 616. If more pages are available in the component 332, 336, 340 with the highest availability, then flow proceeds to block 632 to select the next available page in the component 332, 336, 340 with the highest availability. If more pages are not available in the component 332, 336, 340 with the highest availability, then flow proceeds to decision block 620 to check for any components with nonzero availability.

The process of FIG. 6b advantageously attempts to select additional pages from the component having the highest availability, without requiring additional process steps of recalculating availability each time a new page is needed, as in FIG. 6a.

Referring now to FIG. 7, a flowchart illustrating a method for calculating component availability 616 in accordance with embodiments of the present invention is shown. Flow begins at block 704.

At block 704, the storage controller 308 calculates the total storage tier 328 I/O requests per unit of time. In a preferred embodiment, the unit of time is one minute. In other embodiments the unit of time is less or more than one minute. The total storage tier 328 I/O requests per unit of time includes all I/O requests made to each component 332, 336, 340 in the storage tier 328 during the same unit of time. Flow proceeds to block 708.

At block 708, the storage controller 308 selects an initial component 332, 336, 340 for the availability calculation. In a first embodiment, the storage controller 308 selects component A 332 for the availability calculation. In a second embodiment, the storage controller 308 selects component B 336 for the availability calculation. In a third embodiment, the storage controller 308 selects component C 340 for the availability calculation. Flow proceeds to block 712.

At block 712, the storage controller 308 calculates capacity percentage for the selected component 332, 336, 340. Capacity percentage is the number of in-use pages divided by the total pages for the selected component. Therefore, if component B 336 is the selected component, and component B has 600 in-use pages and 1000 total pages, the capacity percentage for component B 336 is $600/1000$ or 60%. Flow proceeds to block 716.

At block 716, the storage controller 308 calculates capacity-based availability (CBA) for the selected component 332, 336, 340. CBA is 1 minus the square of capacity percentage. The square of CBA is used for this calculation since it results in a CBA curve that remains close to 1 for low fullness percentages, and drops off as fullness reaches 100%. Although a cube function would also work, it is less desirable since more computationally intensive than the square function and provides no greater observed value. Using the 60% capacity percentage example from block 712, the square of 60% is 36%. CBA for component B 336 is 1-36% or 64%. Flow proceeds to block 720.

At block 720, the storage controller 308 calculates I/O load percentage for the selected component 332, 336, 340. I/O load percentage is component IOs/unit of time divided by the total IOs/unit of time for all components 332, 336, 340 in the storage tier 328. If one minute is being used for the unit of time, component B has 100 IOs/minute, and the total IOs/minute for components A 332, B 336, and C 340 are 400 IOs/minute, then I/O load percentage for component B 336 is $^{100}/_{400}$=25%. Flow proceeds to block 724.

At block 724, the storage controller 308 calculates I/O load-based utilization (IBU) for the selected component 332, 336, 340. I/O load-based utilization is I/O load percentage times one minus the CBA. The function (1−CBA) is a capacity utilization number. That is, when CBA is zero, capacity utilization is 100%. I/O load-based utilization is important when utilization is high, but not so important when utilization is low. Therefore, I/O load percentage is multiplied by capacity utilization. Continuing the previous example for component B, I/O load percentage is 25%, and CBA is 64%. Therefore, IBU for component B is 25% times (1 minus 64%)=25% times 36%=9%. Flow proceeds to block 728.

At block 728, the storage controller 308 calculates component availability for the selected component 332, 336, 340. Component availability is CBA minus IBU. For the component B 336 example, CBA is 64% and IBU is 9%. Therefore, component availability for component B is 55%. Flow proceeds to decision block 732.

At decision block 732, the process determines if more components 332, 336, 340 remain to calculate availability. If more components 332, 336, 340 do not remain to calculate availability for, then all components 332, 336, 340 in the storage tier 328 have had availability calculated, then flow ends. If more components 332, 336, 340 remain to calculate availability for, then flow proceeds to block 736.

At block 736, the storage controller 328 selects a next component 332, 336, 340 for the availability calculation. The component 332, 336, 340 selected in this step has not has availability calculated yet in the current execution of FIG. 7. Flow proceeds to block 712, where the availability calculation begins for the newly selected component 332, 336, 340.

Referring now to FIG. 8, a table illustrating an exemplary component availability calculation in accordance with embodiments of the present invention is shown. The table applies sample values to the calculations performed in block 616 of FIGS. 6a and 6b and FIG. 7 to component A 332, component B 336, and component C 340 of FIG. 3.

Again assuming the unit of time is one minute, each of the components has IOs/minute of 15 for component A 332, 10 for component B 336, and 20 for component C 340. This means the total IOs/minute 604 for the storage tier 328 is 45 IOs/minute.

I/O load percentage 720 for each component is component IOs/minute divided by total IOs/minute for the storage tier 328. Therefore, the I/O load % 720 for component A 332 is $^{15}/_{45}$=33.3%, the I/O load % 720 for component B 336 is $^{10}/_{45}$=22.2%, and the I/O load % 720 for component C 340 is $^{20}/_{45}$=44.4%.

Next, the capacity % 712 is calculated for each of components 332, 336, 340. Component A 332 has 100 in-use pages out of 1000 total pages, so component A 332 capacity % is $^{100}/_{1000}$ or 10%. Component B 336 has 200 in-use pages out of 1000 total pages, so component B 336 capacity % is $^{200}/_{1000}$ or 20%. Component C 340 has 200 in-use pages out of 2000 total pages, so component C 340 capacity % is $^{200}/_{2000}$ or 10%.

Capacity-based availability (CBA) 716 is calculated next for each component 332, 336, 340. CBA is 1 minus the square of capacity percentage. Therefore, CBA for component A 332 is $1-(10\%)^2=1-1\%=99\%$, CBA for component B 336 is $1-(20\%)^2=1-4\%=96\%$, and CBA for component C 340 is $1-(10\%)^2=1-1\%=99\%$.

I/O load-based utilization (IBU) 724 is calculated for each component 332, 336, 340 as I/O load % times (1−CBA). Therefore, for component A 332, IBU is 33.3% times (1−99%)=33.3% times 1%=0.0033%. For component B 336, IBU is 22.2% times (1−96%)=22.2% times 4%=0.0088%. For component C 340, IBU is 44.4% times (1−99%)=44.4% times 1%=0.0044%.

Component availability 728 is finally calculated by subtracting IBU from CBA for each of components 332, 336, 340. Therefore, component A 332 availability is 99%−0.0033%=98.9967%, component B 336 availability is 96%−0.0088%=95.9912%, and component C 340 availability is 99%−0.0044%=98.9956%. Component A 332 has slightly higher availability 816 than component C and component B 336 has the lowest availability 820.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for a storage controller to write a data block to one of a plurality of storage components, comprising:
   receiving a write request from a host computer;
   determining at least a portion of the data block includes a Logical Block Address (LBA) that is not currently mapped to a physical page of storage;
   calculating availability for each storage component within the plurality of storage components, wherein storage components are logically addressable storage devices, RAID volumes, or partitions, wherein availability is based on a number of I/O requests directed to the plurality of storage components in a predetermined time period;
   selecting the storage component with a highest calculated availability from the plurality of storage components;
   determining a next available physical page within the selected storage component; and
   writing the at least a portion of the data block including LBAs that are not currently mapped to a physical page of storage to the next available physical page,
   wherein after writing the at least a portion of the data block to the next available physical page, the storage controller determines a plurality of physical pages are required to store data corresponding to the write request, and in response to determining a plurality of physical pages are required to store data corresponding to the write request, the storage controller determines if more physical pages are available in the component with the highest calculated availability.

2. The method of claim 1, wherein the plurality of storage components are within a common storage tier, wherein storage components within a common storage tier have similar performance characteristics.

3. The method of claim 1, wherein after writing the at least a portion of the data block to the next available physical page, the storage controller determines a plurality of physical pages are required to store data corresponding to the write request and repeats calculating availability, selecting the storage component with a highest calculated availability, determining a next physical page, and writing the at least a portion of the data block to the next available physical page until there are no more pages needed to satisfy the write request.

4. The method of claim 1, wherein
if more pages are available in the storage component with the highest calculated availability, the storage controller repeats:
determining a next available physical page within the storage component with the highest calculated availability;
writing the at least a portion of the data block including LBAs that are not currently mapped to a physical page of storage to the next available physical page; and
determining if a plurality of physical pages are required to store data corresponding to the write request; and
wherein if more pages are not available in the storage component with the highest calculated availability, the storage controller repeats:
selecting the storage component with the highest calculated availability from the plurality of storage components;
determining a next available physical page within the storage component with the highest calculated availability;
writing the at least a portion of the data block including LBAs that are not currently mapped to a physical page of storage to the next available physical page; and
determining if a plurality of physical pages are required to store data corresponding to the write request.

5. The method of claim 1, wherein the determining a next available physical page within the selected storage component comprises the storage controller selecting an available physical page with the lowest LBA among all available physical pages in the selected storage component as the next available physical page.

6. The method of claim 2, wherein calculating availability for each storage component comprises:
determining total I/Os per unit of time for all components in the plurality of storage components;
calculating capacity percentage for each component, wherein capacity percentage is in-use pages divided by total pages;
calculating capacity-based availability for each storage component;
calculating I/O load percentage for each component;
calculating I/O load-based utilization for each component; and
calculating component availability for each component, wherein component availability is the difference between capacity-based availability for each component and I/O load-based utilization.

7. The method of claim 6, wherein the storage controller reports an error to a user or system administrator if all storage components have zero calculated availability.

8. The method of claim 6, wherein total I/Os per unit of time for all components in the plurality of storage components is the sum of I/Os per unit of time for each component in the plurality of storage components.

9. The method of claim 6, wherein capacity-based availability is equal to one minus the square of capacity percentage.

10. The method of claim 9, wherein I/O load percentage is equal to component I/Os per unit of time divided by total I/Os per unit of time for all components in the plurality of storage components, wherein I/O load-based utilization is equal to I/O load percentage times the difference between 1 and capacity-based availability, wherein component availability is equal to the difference between capacity-based availability and I/O load-based utilization.

11. The method of claim 6, wherein the storage controller calculates availability for each storage component within the plurality of storage components using a floating-point arithmetic unit.

12. A system for writing a data block, comprising:
a host computer, wherein the host computer generates a write request comprising a data block;
a plurality of storage components, wherein each of the plurality of storage components comprises a plurality of physical pages, wherein the write request is directed to a range of logical block addresses (LBAs) within the plurality of storage components, wherein storage components are logically addressable storage devices, RAID volumes, or partitions; and
a storage controller, coupled to the host computer and the plurality of storage components, comprising:
a processor, wherein the storage controller receives the write request from the host computer, and in response the processor:
determines at least a portion of the data block includes an LBA that is not currently mapped to a physical page of storage;
calculates availability for each storage component within the plurality of storage components, wherein availability is based on a number of I/O requests directed to the plurality of storage components in a predetermined time period;
selects the storage component with a highest calculated availability from the plurality of storage components;
determines a next available physical page within the selected storage component; and
writes the at least a portion of the data block including LBAs that are not currently mapped to a physical page of storage to the next available physical page,
wherein after writing the at least a portion of the data block to the next available physical page, the processor determines a plurality of physical pages are required to store data corresponding to the write request, and in response to determining a plurality of physical pages are required to store data corresponding to the write request, the processor determines if more physical pages are available in the component with the highest calculated availability.

13. The system of claim 12, wherein the plurality of storage components are within a common storage tier, wherein storage components within a common storage tier have similar performance characteristics.

14. The system of claim 12, wherein after the processor writes the at least a portion of the data block to the next available physical page, the processor determines a plurality of physical pages are required to store data corresponding to the write request, and repeats calculates availability, selects the storage component with a highest calculated availability, determines a next physical page, and writes the at least a portion of the data block to the next available physical page until there are no more pages needed to satisfy the write request.

15. The system of claim 12, wherein
if more pages are available in the storage component with the highest calculated availability, the processor repeats:

determines a next available physical page within the storage component with the highest calculated availability;

writes the at least a portion of the data block including LBAs that are not currently mapped to a physical page of storage to the next available physical page; and determines if a plurality of physical pages are required to store data corresponding to the write request; and wherein if more pages are not available in the storage component with the highest calculated availability, the processor repeats:

selects the storage component with the highest calculated availability from the plurality of storage components;

determines a next available physical page within the storage component with the highest calculated availability;

writes the at least a portion of the data block including LBAs that are not currently mapped to a physical page of storage to the next available physical page; and determines if a plurality of physical pages are required to store data corresponding to the write request.

16. The system of claim 13, wherein the processor calculates availability for each storage component comprises the processor determines total I/Os per unit of time for all components in the plurality of storage components, calculates capacity percentage for each component, calculates capacity-based availability for each storage component, calculates I/O load percentage for each component, calculates I/O load-based utilization for each component, and calculates component availability for each component, wherein component availability is the difference between capacity-based availability for each component and I/O load-based utilization, wherein capacity percentage is in-use pages divided by total pages.

17. The system of claim 16, wherein the processor calculates availability for each storage component within the plurality of storage components using a floating-point arithmetic unit.

18. The system of claim 16, wherein total I/Os per unit of time for all components in the plurality of storage components is the sum of I/Os per unit of time for each component in the plurality of storage components.

19. The system of claim 16, wherein capacity-based availability is equal to one minus the square of capacity percentage.

20. The system of claim 19, wherein I/O load percentage is equal to I/Os per unit of time divided by total I/Os per unit of time for all components in the plurality of storage components, wherein I/O load-based utilization is equal to I/O load percentage times the difference between 1 and capacity-based availability, wherein component availability is equal to the difference between capacity-based availability and I/O load-based utilization.

* * * * *